United States Patent
Aoyama

(10) Patent No.: US 6,880,325 B2
(45) Date of Patent: Apr. 19, 2005

(54) GAS TURBINE COMBUSTOR APPARATUS

(75) Inventor: Kuniaki Aoyama, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/226,149

(22) Filed: Aug. 23, 2002

(65) Prior Publication Data

US 2003/0037536 A1 Feb. 27, 2003

(30) Foreign Application Priority Data

Aug. 24, 2001 (JP) .................................... 2001-254357

(51) Int. Cl.⁷ .............................................. F02G 3/00
(52) U.S. Cl. ....................... 60/39.37; 60/737; 60/739
(58) Field of Search ........................ 60/39.37, 737, 60/739, 748

(56) References Cited

U.S. PATENT DOCUMENTS

| | | | |
|---|---|---|---|
| 4,589,260 A | * 5/1986 | Krockow | .................. 60/737 |
| 5,319,931 A | 6/1994 | Beebe et al. | |
| 6,092,362 A | * 7/2000 | Nagafuchi et al. | ........ 60/39.281 |
| 6,095,793 A | 8/2000 | Greeb | |
| 6,189,321 B1 | 2/2001 | Banhardt et al. | |
| 6,209,310 B1 | 4/2001 | Küenzi et al. | |

FOREIGN PATENT DOCUMENTS

| | | |
|---|---|---|
| CN | 1227308 | 9/1999 |
| CN | 1244645 | 2/2000 |
| EP | 0 962 704 | 12/1999 |
| EP | 1 067 338 | 1/2001 |
| JP | 3189135 | 5/2001 |

OTHER PUBLICATIONS

Patent Abstracts of Japan, JP 59–007739, Jan. 14, 1984.

* cited by examiner

Primary Examiner—Charles G. Freay
(74) Attorney, Agent, or Firm—Oblon, Spivak, McClelland, Maier & Neustadt, P.C.

(57) ABSTRACT

A gas turbine combustor apparatus comprising plural combustors and plural fuel supply systems realizes a combustion of a lean and uniform pre-mixture in each of the combustors to thereby enable to reduce NOx generation. Flow regulating valves 29, 30 are provided in fuel supply systems 23, 24, respectively, that supply combustors 25, 26 with fuel. Pressure gauges 31, 32 are provided in the fuel supply systems 23, 24, respectively, in front of inlets of the combustors 25, 26. The flow regulating valves 29, 30 are controlled so that pressures measured by the pressure gauges 31, 32 become the same.

1 Claim, 2 Drawing Sheets

GAS TURBINE COMBUSTOR APPARATUS

BACKGROUND OF THE INVENTION

1. Field of the Invention

The present invention relates generally to a gas turbine combustor apparatus comprising a plurality of combustors and more particularly to a gas turbine combustor apparatus by which a combustion of a lean and uniform pre-mixture is realized in each of the plurality of combustors.

2. Description of the Prior Art

The gas turbine combustor apparatus comprises therein a plurality of combustors that are arranged along a circumferential direction around a gas turbine rotor. As shown in FIG. 2, each of the combustors 1 is constructed such that a pilot nozzle 8 is centrally arranged and a plurality of pre-mixing nozzle 8 are arranged around the pilot nozzle 8. Numeral 11 designates a swirling vane. While fuel is injected from a dual fuel nozzle 2 provided in the pre-mixing nozzle device 10 and is mixed with air to form a pre-mixture, such air is subjected to a swirling force by the swirling vane before it is mixed with the fuel.

While the dual fuel nozzle 2 is shown as comprising a plurality of pieces in the pre-mixing nozzle device 10, one example of the dual fuel nozzle 2 is shown in FIG. 3. This dual fuel nozzle 2 is constructed such that gas fuel led through a gas fuel flow passage 5 is injected from a gas fuel injection port 7 immediately downstream of the swirling vane 11 and liquid fuel led through a liquid fuel flow passage 4 is injected from a liquid fuel injection port 6 downstream of the gas fuel injection port 7. Incidentally, in FIG. 3, numeral 3 designates a rod member, which constitutes a fuel supply pipe, and numeral 9 designates a cylindrical pre-mixing nozzle member.

In the gas turbine combustor apparatus constructed by comprising such a multiplicity of combustors 1, in order to reduce NOx (nitrogen oxides) generated by combustion, it is necessary to realize a combustion of a lean and uniform pre-mixture in each of the combustors. For this purpose, in manufacturing the combustors, it is necessary to work each of the fuel nozzles of the combustors with a high degree of accuracy so that each of the nozzles may be made in the same dimensions and shapes. However, according to the accuracy of the currently available working technology, it is not always easy, but instead difficult, to obtain a desired uniformity of the accuracy for each of the nozzles and this presently there is accordingly a limitation in the NOx reduction also.

SUMMARY OF THE INVENTION

It is therefore an object of the present invention to provide a gas turbine combustor apparatus in a gas turbine that comprises a plurality of combustors and a plurality of fuel supply systems connected to the plurality of combustors for fuel supply therethrough, wherein the gas turbine combustor apparatus is constructed such that a lean and uniform pre-mixture is formed to be burned in each of the combustors to thereby enable to reduce NOx generation.

In order to solve the mentioned object, the present invention provides:

A gas turbine combustor apparatus, the gas turbine comprising a plurality of combustors and a plurality of fuel supply systems, each of which is connected to each of the plurality of combustors so as to supply fuel therethrough, characterized in that the gas turbine combustor apparatus is constructed such that a flow regulating valve is provided in each of the plurality of fuel supply systems, a pressure gauge is provided in each of the plurality of fuel supply systems in front of a fuel inlet of each of the plurality of combustors and the flow regulating valve is controlled so that pressure measured by the pressure gauge may become the same with respect to all of the plurality of combustors.

In the gas turbine combustor apparatus of the present invention constructed as mentioned above, the flow regulating valves of the respective fuel supply systems are controlled so that the pressures in the respective fuel supply systems at the position in front of the fuel inlets of the respective combustors may become the same with respect to all of the combustors and thereby a uniform mixture can be formed in each of the combustors.

Also, in order to solve the mentioned object, the present invention provides:

A gas turbine combustor apparatus, the gas turbine comprising a plurality of combustors and a plurality of fuel supply systems, each of which is connected to each of the plurality of combustors so as to supply fuel therethrough, characterized in that the gas turbine combustor apparatus is constructed such that a flow regulating valve is provided in each of the plurality of fuel supply systems, a flow meter is provided in each of the plurality of fuel supply systems in front of a fuel inlet of each of the plurality of combustors and the flow regulating valve is controlled so that flow rate measured by the flow meter may become the same with respect to all of the plurality of combustors.

In the gas turbine combustor apparatus of the present invention constructed as mentioned above, the flow regulating valves of the respective fuel supply systems are controlled so that the flow rates in the respective fuel supply systems at the position in front of the fuel inlets of the respective combustors may become the same with respect to all of the combustors and thereby a uniform mixture can be formed in each of the combustors.

Also, in order to solve the mentioned object, the present invention provides:

A gas turbine combustor apparatus, the gas turbine comprising a plurality of combustors and a plurality of fuel supply systems, each of which is connected to each of the plurality of combustors so as to supply fuel therethrough, characterized in that the gas turbine combustor apparatus is constructed such that a flow regulating valve is provided in each of the plurality of fuel supply systems, a thermometer is provided at a blade passing point downstream of each of the plurality of combustors and the flow regulating valve is controlled so that temperature measured by the thermometer may become the same with respect to all of the plurality of combustors.

According to the gas turbine combustor apparatus constructed as mentioned above, the flow rates of the fuel flowing in the respective fuel supply systems are adjusted so that the temperatures at the blade passing points downstream of the respective combustors may become the same with respect to all of the combustors and thereby a lean pre-mixture formed in each of the combustors can be made uniform.

Also, in order to solve the mentioned object, the present invention provides:

A gas turbine combustor apparatus, the gas turbine comprising a plurality of combustors and a plurality of fuel supply systems, each of which is-connected to each of the plurality of combustors so as to supply fuel therethrough, characterized in that the gas turbine combustor apparatus is constructed such that a flow regulating valve is provided in each of the plurality of fuel supply systems, a thermometer for measuring metal temperature is provided on or in a stationary blade downstream of each of the plurality of combustors and the flow regulating valve is controlled so that temperature measured by the thermometer may become the same with respect to all of the plurality of combustors.

According to the gas turbine combustor apparatus constructed as mentioned above, the flow rates of the fuel flowing in the respective fuel supply systems are adjusted so that metal temperatures of the stationary blades positioned downstream of the respective combustors may become the same with respect to all of the combustors and thereby a lean pre-mixture formed in each of the combustors can be made uniform.

Furthermore, in order to solve the mentioned object, the present invention provides:

A gas turbine combustor apparatus, the gas turbine comprising a plurality of combustors and a plurality of fuel supply systems, each of which is connected to each of the plurality of combustors so as to supply fuel therethrough, characterized in that the gas turbine combustor apparatus is constructed such that a flow regulating valve is provided in each of the plurality of fuel supply systems, a thermometer for measuring metal temperature is provided on or in each of the plurality of combustors and the flow regulating valve is controlled so that temperature measured by the thermometer may become the same with respect to all of the plurality of combustors.

According to the gas turbine combustor apparatus constructed as mentioned above, the flow rates of the fuel flowing in the respective fuel supply systems are adjusted so that metal temperatures of the respective combustors may become the same with respect to all of the combustors and thereby a lean pre-mixture formed in each of the combustors can be made uniform.

A gas turbine combustor apparatus of the present invention may be constructed such that a plurality of constructions are taken out of the constructions as mentioned above, an optimal solution is obtained by the method of least squares and the flow regulating valve is controlled so as to meet the optimal solution. Thereby, uniformity of the pre-mixture formed in each of the combustors can be further enhanced.

Also, in order to solve the mentioned object, the present invention provides:

A gas turbine combustor apparatus, the gas turbine comprising a plurality of combustors and a plurality of fuel supply systems, each of which is connected to each of the plurality of combustors so as to supply fuel therethrough, characterized in that the gas turbine combustor apparatus is constructed such that a flow regulating valve is provided in each of the plurality of fuel supply systems, spectrum analyses are carried out on measured values of inner pressure variations in each of the plurality of combustors and the flow regulating valve corresponding to the combustor in which the inner pressure variations in a specific frequency range become a predetermined value or more is controlled to be opened or closed.

According to the gas turbine combustor apparatus constructed as mentioned above, the flow regulating valves of the respective fuel supply systems are controlled so that frequencies caused by the inner pressure variations in a specific frequency range may not become a predetermined value or more in each of the combustors and thereby a uniform pre-mixture can be formed in each of the combustors.

In the gas turbine combustor apparatus as described above, a construction may be employed such that a control unit is provided and, if an average value of openings of the respective flow regulating valves exceeds a predetermined value, the control unit adds a difference between the predetermined value and the average value to the openings of the respective flow regulating valves. This is preferable as the opening and closing control of the flow regulating valve can be stabilized.

Also, in the gas turbine combustor apparatus as described above, such a construction may be employed that a control unit is provided and, if a load shutoff signal is given for the plurality of combustors, the control unit gives signals so that openings of the respective flow regulating valves may be set to a predetermined position. This is preferable as the flow regulating valves in the respective fuel supply systems can be caused to immediately respond to a load shutoff operation.

Further, in the gas turbine combustor apparatus as described above, a construction may be employed such that an alarm circuit is provided and, if the flow regulating valve is opened or closed in excess of a predetermined value, the alarm circuit generates an alarm of such unusual state of a fuel system. This is preferable as an unusual state of the fuel system is made known and an immediate countermeasure can be taken.

DESCRIPTION OF THE PREFERRED EMBODIMENTS

Figure 1:
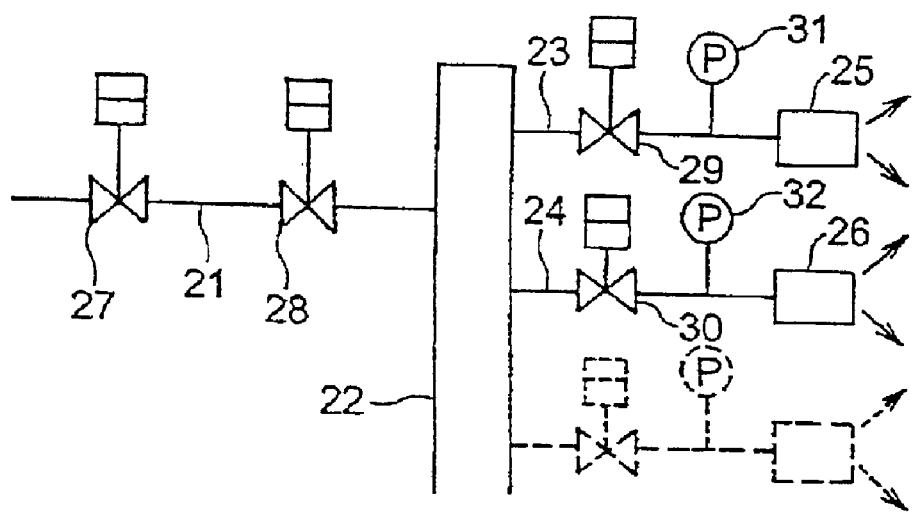
FIG. 1 is an explanatory view showing a construction of a gas turbine combustor apparatus of an embodiment according to the present invention.
Figure 2:
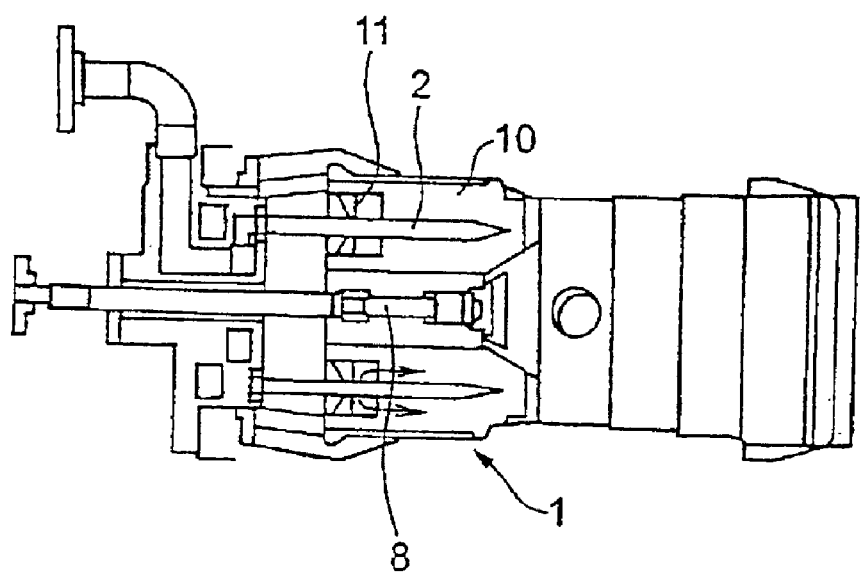
FIG. 2 is a longitudinal cross sectional view showing one example of a structure of a gas turbine combustor apparatus in the prior art.
Figure 3:
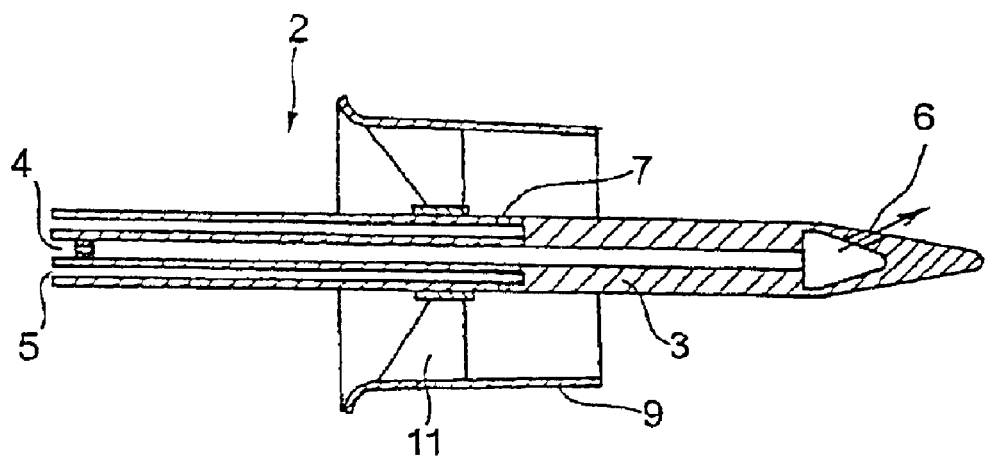
FIG. 3 is a longitudinal cross sectional view showing a structure of a dual fuel nozzle used in the gas turbine combustor apparatus of FIG. 2.

Herebelow, a gas turbine combustor apparatus of the present invention will be described more concretely based on an embodiment shown in FIG. 1. It is to be noted that, while a plurality of fuel supply systems are provided, only two of them will be representatively taken for description. In FIG. 1, numeral 21 designates a fuel supply pipe and construction of the system is made such that fuel led through the fuel supply pipe 21 enters fuel supply systems 23, 24 via a manifold 22 to be supplied into respective combustors 25, 26. A pressure regulating valve 27 and a flow regulating valve 28 are provided in the fuel supply pipe 21. Also, flow regulating valves 29, 30 and pressure gauges 31, 32 are provided in the fuel supply systems 23, 24, respectively, that connect to the combustors 25, 26.

Here, the construction of the entire system is made such that the flow regulating valves 29, 30 provided in the fuel supply systems 23, 24, respectively, are controlled to be opened or closed so that pressures measured by the pressure gauges 31, 32 provided in the fuel supply systems 23, 24, respectively, may become the same. By so effecting the control, pressures in the fuel supply systems 23, 24, through which the respective combustors 25, 26 are supplied with fuel, are maintained to the same value and thereby a uniform pre-mixture can be formed in each of the combustors.

In the gas turbine combustor apparatus of FIG. 1 as described above, the construction is made so that the pressures in the fuel supply systems connecting to the respective combustors may become the same. However, if flow meters are provided in the fuel supply systems instead of the pressure gauges and the construction is made such that the flow regulating valves of the respective fuel supply systems are controlled to be opened or closed so that flow rates measured by the flow meters may become the same, then it is also possible to obtain the same effect.

Alternatively, instead of the pressure gauges or the flow meters as mentioned above, if thermometers are provided for measuring temperatures at blade passing points downstream of the respective combustors, or metal temperatures of stationary blades downstream of the respective combustors, or metal temperatures of the respective combustors and the construction is made such that the flow regulating valves of the respective fuel supply systems are controlled to be opened or closed so that the temperatures so measured may become the same, then it is also possible to obtain the same effect.

In the above-noted situation, while the description has been made on controlling the control systems having respectively the single pressure gauge, flow meter or thermometer, the construction may be such that at least two of the mentioned control systems are provided and an optimal solution is obtained by the method of least squares, so that the flow regulating valve provided in each of the fuel supply systems is optimally controlled. This is preferable for forming a uniform pre-mixture in each of the combustors.

Furthermore, instead of using the pressure gauges or the flow meters for controlling the flow regulating valves in the plurality of fuel supply systems, the construction may be made such that spectrum analyses are carried out on measured values of inner pressure variations in each of the combustors and the mentioned flow regulating valve corresponding to the combustor in which the inner pressure variations in a specific frequency range become a predetermined value or more is controlled to be opened or closed. For example, if the variation includes much of high frequencies, the flow regulating valve is considered too much throttled and the control is done so as to open the flow regulating valve. Or, if the variation includes much of low frequencies, it is considered an excess of fuel and the control is done so as to throttle the flow regulating valve. Thus, by controlling the flow regulating valve in each of the fuel supply systems so that the inner pressure variations in a specific frequency range may not become a predetermined value or more in each of the combustors, a uniform pre-mixture can be formed in each of the combustors.

In the above, while the invention has been described based on the gas turbine combustor apparatus of the embodiments, the invention is not limited to the embodiments but may naturally be added with various modifications or alterations as come within the scope of the invention defined by the claims as appended herein.

For example, in the gas turbine combustor apparatus of the embodiments according to the present invention as described above, the construction may be made such that a control unit is provided and, if an average value of openings of the flow regulating valves provided in the respective fuel supply systems exceeds a predetermined value, the control unit adds a difference between the predetermined value and the average value to the openings of the respective flow regulating valves. Then, the opening and closing control of the flow regulating valves can be made a more stabilized one.

Or, in the gas turbine combustor apparatus of the embodiments of the present invention, the construction may be made such that a control unit is provided and, if a load shutoff signal is given for the combustors, the control unit gives signals so that openings of the respective flow regulating valves may be set to a predetermined position. Then, the flow regulating valve in each of the fuel supply systems can be immediately set to such an opening position as corresponds to the load shutoff operation.

Also, in the gas turbine combustor apparatus of the embodiments of the present invention, the construction may be such that an alarm circuit is provided and, if the flow regulating valve provided in each of the fuel supply systems is opened or closed in excess of a predetermined value, the alarm circuit gives an alarm of the unusual state of the fuel systems. Then, an unusual state of the fuel systems, such as an irregularity in the openings of the flow regulating valves, is made known and an immediate countermeasure can be taken.

What is claimed is:

1. A gas turbine combustor apparatus, said gas turbine combustor apparatus comprising a plurality of combustors and a plurality of fuel supply systems, each of which is connected to each of said plurality of combustors so as to supply fuel therethrough, and a controller, wherein said gas turbine combustor apparatus is constructed such that a flow regulating valve is provided in each of said plurality of fuel supply systems, a pressure gauge is provided in each of said plurality of fuel supply systems in front of a fuel inlet of each of said plurality of combustors and said flow regulating valve is controlled by said controller so that pressure measured by said pressure gauge may become the same with respect to all of said plurality of combustors.

* * * * *